United States Patent
Kang et al.

(10) Patent No.: US 12,444,752 B2
(45) Date of Patent: Oct. 14, 2025

(54) LITHIUM SECONDARY BATTERY

(71) Applicant: SK ON CO., LTD., Seoul (KR)

(72) Inventors: Hee Gyoung Kang, Daejeon (KR); Gi Hyeon Moon, Daejeon (KR); So Hyun Park, Daejeon (KR); Mi Ryeong Lee, Daejeon (KR); Jong Hyuk Lee, Daejeon (KR); Chan Young Jeon, Daejeon (KR); Hae Suk Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 780 days.

(21) Appl. No.: 17/686,030

(22) Filed: Mar. 3, 2022

(65) Prior Publication Data

US 2022/0285693 A1    Sep. 8, 2022

(30) Foreign Application Priority Data

Mar. 4, 2021   (KR) .................. 10-2021-0028737

(51) Int. Cl.
H01M 4/70    (2006.01)
H01M 4/02    (2006.01)
(Continued)

(52) U.S. Cl.
CPC .............. H01M 4/70 (2013.01); H01M 4/13 (2013.01); H01M 10/0525 (2013.01); H01M 10/0585 (2013.01)

(58) Field of Classification Search
CPC ...... H01M 4/70; H01M 4/13; H01M 10/0525; H01M 10/0585; H01M 4/02;
(Continued)

(56) References Cited

U.S. PATENT DOCUMENTS

2013/0017425 A1* 1/2013 Watanabe ............... H01M 6/42
                                                        29/623.5
2015/0017523 A1* 1/2015 Hirai .................... H01M 50/533
                                                        427/126.3

FOREIGN PATENT DOCUMENTS

JP       2007329077 A  * 12/2007
JP       2011-138729 A    7/2011
(Continued)

OTHER PUBLICATIONS

Extended European Search Report for the European Patent Application No. 22159012.8 issued by the European Patent Office on Sep. 23, 2022.

*Primary Examiner* — Ula C Ruddock
*Assistant Examiner* — Sydney L Kline
(74) *Attorney, Agent, or Firm* — IP & T GROUP LLP (57) ABSTRACT

The lithium secondary battery includes a cathode which includes a cathode active material layer including a cathode current collector, a cathode tab protruding from one end thereof in a longitudinal direction of the cathode current collector, a second cathode portion disposed spaced apart from the cathode tab on the cathode current collector, and a first cathode portion disposed adjacent to the cathode tab on the cathode current collector and having an electrode density higher than that of the second cathode portion, and an anode disposed to face the cathode. Life-span characteristics of the lithium secondary battery may be improved by controlling the electrode density in the peripheral part of the cathode tab.

11 Claims, 2 Drawing Sheets

(51) Int. Cl.
*H01M 4/13* (2010.01)
*H01M 10/0525* (2010.01)
*H01M 10/058* (2010.01)
*H01M 10/0585* (2010.01)

(58) Field of Classification Search
CPC ......... H01M 10/058; H01M 2004/027; H01M 2004/028; H01M 2004/021
See application file for complete search history.

(56) References Cited

FOREIGN PATENT DOCUMENTS

| | | | |
|---|---|---|---|
| JP | 2016058247 A | * | 4/2016 |
| KR | 10-0548988 B1 | | 2/2006 |
| KR | 10-1621591 B1 | | 5/2016 |
| KR | 10-1710654 B1 | | 2/2017 |
| KR | 10-2053063 B1 | | 12/2019 |

* cited by examiner

LITHIUM SECONDARY BATTERY

CROSS-REFERENCE TO RELATED APPLICATION(S)

This application claims benefit of priority to Korean Patent Application No. 10-2021-0028737 filed on Mar. 4, 2021 in the Korean Intellectual Property Office, the disclosure of which is incorporated herein by reference in its entirety.

BACKGROUND OF THE INVENTION

1. Field of the Invention

The present invention relates to a lithium secondary battery, and more specifically, to a lithium secondary battery which includes a cathode including a lithium metal oxide-based cathode active material for a lithium secondary battery.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, during charging and discharging of the lithium secondary battery, lithium ions may be precipitated due to a difference in a moving speed of lithium ions. Thereby, life-span characteristics and operational reliability of the secondary battery may be reduced.

For example, Korean Patent Registration Publication No. 10-0548988 discloses a lithium secondary battery, but there is a limitation in securing sufficient life-span characteristics and stability.

PRIOR ART DOCUMENT

Patent Document

Korean Patent Registration Publication No. 10-0548988

SUMMARY OF THE INVENTION

It is an object of the present invention to provide a lithium secondary battery having excellent operational stability and reliability.

To achieve the above object, according to an aspect of the present invention, there is provided a lithium secondary battery including: a cathode which includes a cathode current collector including a cathode tab protruding from one end thereof, and a cathode active material layer formed on the cathode current collector; and an anode disposed to face the cathode, wherein the cathode active material layer may include: a first cathode portion disposed adjacent to the cathode tab in a planar direction; and a second cathode portion spaced apart from the cathode tab with the first cathode portion interposed therebetween in the planar direction and having an electrode density lower than that of the first cathode portion.

In some embodiments, a cathode density difference defined by Formula 1 below may be 1.5 to 6%:

$$D_{dP}(\%) = \frac{D_{1P} - D_{2P}}{D_{2P}} \times 100 \qquad \text{[Equation 1]}$$

(In Equation 1, $D_{dP}$ is the cathode density difference, $D_{1P}$ is the electrode density of the first cathode portion, and $D_{2P}$ is the electrode density of the second cathode portion).

In some embodiments, the anode may include: an anode current collector including an anode tab protruding from one end thereof; and an anode active material layer formed on the anode current collector, wherein the anode active material layer may include: a first anode portion disposed adjacent to the anode tab in the planar direction; and a second anode portion spaced apart from the anode tab with the first anode portion interposed therebetween in the planar direction and having an electrode density lower than that of the first anode portion.

In some embodiments, an anode density difference defined by Formula 2 below may be 1.5 to 6%:

$$D_{dN}(\%) = \frac{D_{1N} - D_{2N}}{D_{1N}} \times 100 \qquad \text{[Equation 2]}$$

(In Equation 2, $D_{dN}$ is the anode density difference, $D_{1N}$ is the electrode density of the first anode portion, and $D_{2N}$ is the electrode density of the second anode portion).

In some embodiments, the first cathode portion and the second anode portion may be overlapped with each other in a thickness direction, and the second cathode portion and the first anode portion may be overlapped with each other in the thickness direction.

In some embodiments, a length of the first cathode portion may be the same as that of the second anode portion, and a length of the second cathode portion may be the same as that of the first anode portion in the planar direction.

In some embodiments, the cathode tab and the anode tab may protrude in directions opposite to each other in the planar direction.

In some embodiments, a length of the first cathode portion may be less than or equal to that of the second cathode portion, and a length of the second anode portion may be less than or equal to that of the first anode portion.

In some embodiments, a thickness of the first cathode portion may be smaller than that of the second cathode portion, and a thickness of the second anode portion may be greater than that of the first anode portion.

The lithium secondary battery may further include a separator disposed between the cathode active material layer and the anode active material layer, wherein the separator may include: a first portion disposed between the first cathode portion and the second anode portion; a second portion disposed between the second cathode portion and the first anode portion; and a stepped portion between the first portion and the second portion.

In some embodiments, the stepped portion may contact sidewalls of the second cathode portion and the second anode portion.

In some embodiments, an electrode density of the first cathode portion may be 3.6 g/cc or less, and an electrode density of the first anode portion may be 1.7 g/cc or less.

The lithium secondary battery according to the above-described exemplary embodiments may include a cathode having a relatively high electrode density in a peripheral part of the cathode tab. In this case, a cathode resistance in the peripheral part of the cathode tab may be increased, such that a moving speed of lithium ions in the cathode may be reduced. Thereby, it is possible to prevent a lithium precipitation phenomenon caused by the lithium ions moving to the anode at an excessive speed. Also, it is possible to suppress a swelling phenomenon during charging and discharging of the secondary battery by implementing a uniform moving speed of lithium ions as a whole.

In exemplary embodiments, the lithium secondary battery may include an anode having a relatively low electrode density in the peripheral part of the cathode tab. In this case, an anode resistance in the peripheral part of the cathode tab is decreased, such that a limit moving speed of lithium ions in the anode may be increased. Thereby, it is possible to prevent the lithium precipitation phenomenon caused by lithium ions moving beyond the limit moving speed in the anode.

In some embodiments, the lithium secondary battery may include the separator including the stepped portion. Thereby, an increase in the thickness of the lithium secondary battery may be minimized and the above-described effect of improving the life-span characteristics may be implemented.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Embodiments of the present invention provide a lithium secondary battery which includes a cathode including a cathode active material having parts with different electrode densities.

Hereinafter, embodiments of the present invention will be described in detail with reference to the accompanying drawings. However, these embodiments are merely an example, and the present invention is not limited to the specific embodiments described as the example.

Figure 1:
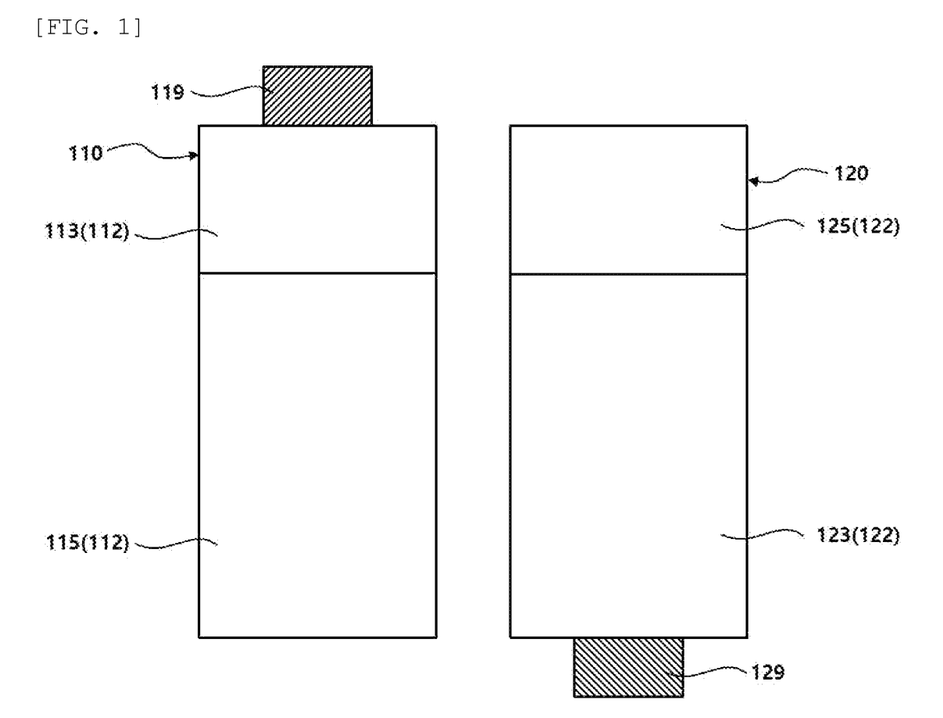
FIG. 1 is a schematic plan view illustrating electrodes according to exemplary embodiments.

FIG. 1 is a schematic plan view illustrating electrodes according to exemplary embodiments. Specifically, FIG. 1 is a schematic plan view illustrating a cathode and an anode according to exemplary embodiments. In FIG. 1, for the convenience of description, individual cathodes and anodes are shown by separating from each other in a planar direction. An electrode stack structure including the cathode and the anode is shown in FIG. 2.

Figure 2:
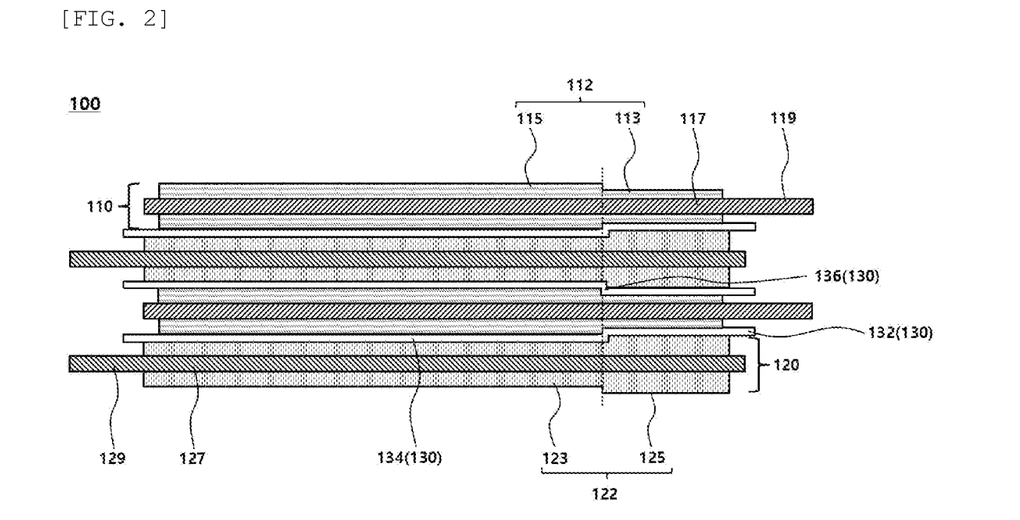
FIG. 2 is a schematic cross-sectional view illustrating an electrode stack structure according to exemplary embodiments.

FIG. 2 is a schematic cross-sectional view illustrating an electrode stack structure according to exemplary embodiments. Specifically, FIG. 2 is a cross-sectional view illustrating an electrode stack structure in which the cathode and the anode are alternately and repeatedly laminated.

Hereinafter, the electrodes of the lithium secondary battery and the electrode stack structure will be described with reference to FIGS. 1 and 2.

Referring to FIGS. 1 and 2, the lithium secondary battery may include an electrode assembly including a cathode 110, an anode 120, and a separator 130 interposed between the cathode and the anode. For example, the electrode assembly may be housed in a case 220 together with an electrolyte and impregnated.

For example, the cathode 110, the anode 120, and the separator 130 may be alternately and repeatedly laminated to form an electrode stack structure 100.

In exemplary embodiments, the cathode 110 may include a cathode current collector 117 including a cathode tab 119 protruding from one end thereof, and a cathode active material layer 112 formed on the cathode current collector 117.

For example, the cathode current collector 117 and the cathode tab 119 may include stainless steel, nickel, aluminum, titanium, copper, or an alloy thereof, and preferably aluminum or an aluminum alloy. For example, the cathode current collector 117 and the cathode tab 119 may be integrally formed with each other using substantially the same member.

For example, the cathode active material layer 112 may be formed by applying a cathode active material to the cathode current collector 117. For example, the cathode active material may include a compound capable of reversibly intercalating and deintercalating lithium ions.

In exemplary embodiments, the cathode active material may include lithium-transition metal composite oxide particles. For example, the lithium-transition metal composite oxide particles include nickel (Ni), and may further include at least one of cobalt (Co) and manganese (Mn).

For example, the lithium-transition metal composite oxide particles may be represented by Formula 1 below.

[Formula 1]

$$Li_xNi_{1-y}M_yO_{2+z}$$ [Formula 1]

In Formula 1, x and y may be in a range of 0.9≤x≤1.2, and 0≤y≤0.5, respectively, and z may be in a range of −0.1≤z≤0.1. M may denote at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr.

In some embodiments, a molar ratio or concentration (1−y) of Ni in Formula 1 may be 0.8 or more, and exceeds 0.8 in a preferred embodiment. In this case, since a high content of Ni is included in the cathode active material, output characteristics of the secondary battery may be improved.

Ni may be provided as a transition metal associated with the output and capacity of the lithium secondary battery. Therefore, as described above, by employing the composition of high-nickel (high-Ni) contents in the lithium-transition metal composite oxide particles, it is possible to provide a high-power cathode and a high-power lithium secondary battery.

In this regard, as the content of Ni is increased, long-term storage stability and life-span stability of the cathode or the secondary battery may be relatively reduced. However, according to exemplary embodiments, by including Co, the life-span stability and capacity retention characteristics may be improved through Mn while maintaining electrical conductivity.

In some embodiments, the cathode active material or the lithium-transition metal composite oxide particles may further include a coating element or doping element. For example, the coating element or doping element may include Al, Ti, Ba, Zr, Si, B, Mg, P, or an alloy thereof or an oxide thereof. These may be used alone or in combination of two or more thereof. The cathode active material particles are passivated by the coating or doping element, thereby stability and life-span for penetration of an external object may be more improved.

A slurry may be prepared by mixing and stirring the cathode active material including the above-described lithium-transition metal composite oxide particles with a binder, a conductive material and/or a dispersant in a solvent. The slurry may be applied to the cathode current collector 117, followed by compressing and drying to manufacture the cathode 110.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

In exemplary embodiments, the cathode active material layer 112 may include a first cathode portion 113 disposed on the cathode current collector 117 and located adjacent to the cathode tab 119 in the planar direction, and a second cathode portion 115 spaced apart from the cathode tab 119 with the first cathode portion 113 interposed therebetween in the planar direction.

For example, a move speed of lithium ions may be the highest in a peripheral part of the cathode tab 119. Accordingly, lithium ions may excessively quickly move to the anode in the peripheral part of the cathode tab 119, thereby resulting in a lithium precipitation phenomenon.

According to embodiments of the present invention, an electrode density of the first cathode portion 113 may be higher than that of the second cathode portion 115. In this case, a cathode resistance in the peripheral part (e.g., the first cathode portion 113) of the cathode tab 119 may be relatively increased to decrease the moving speed of lithium ions. Accordingly, it is possible to prevent the lithium precipitation phenomenon caused by lithium ions moving to the anode 120 at an excessive speed. Also, it is possible to suppress a swelling phenomenon during charging and discharging of the secondary battery by implementing a uniform moving speed of lithium ions as a whole. Therefore, life-span characteristics of the secondary battery may be improved, for example.

In some embodiments, a cathode density difference defined by Equation 1 below may be 1.5 to 6%.

$$D_{dP}(\%) = \frac{D_{1P} - D_{2P}}{D_{2P}} \times 100 \quad \text{[Equation 1]}$$

In Equation 1, $D_{dP}$ may be the cathode density difference, $D_{1P}$ may be the electrode density of the first cathode portion, and $D_{2P}$ may be the electrode density of the second cathode portion.

For example, when satisfying the above range of the cathode density difference, while the moving speed of lithium ions in the peripheral part (e.g., the first cathode portion 113) of the cathode tab 119 is sufficiently reduced, the cathode resistance may be appropriately controlled to maintain output characteristics of the battery For example, the cathode density difference may be implemented through a thickness difference between the cathode portions 113 and 115. For example, a thickness of the first cathode portion 113 may be smaller than that of the second cathode portion 115. Accordingly, it may be designed so that the electrode density of the first cathode portion 113 is greater than that of the second cathode portion 115.

In some embodiments, the electrode density of the second cathode portion 115 may be 3.6 g/cc or less. In this case, the electrode density of the first cathode portion 113 may be about 3.82 g/cc or less according to Equation 1 above.

In exemplary embodiments, the anode 120 may include an anode current collector 127 including an anode tab 129 protruding from one end thereof, and an anode active material layer 122 formed on the anode current collector 127.

The anode current collector 127 may include, for example, gold, stainless steel, nickel, aluminum, titanium, copper, or an alloy thereof, and preferably copper or a copper alloy.

For example, the anode active material layer 122 may be formed by applying an anode active material to the anode current collector 127.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; a silicon compound or tin may be used. Examples of the amorphous carbon may include hard carbon, cokes, mesocarbon microbead (MCMB), mesophase pitch-based carbon fiber (MPCF) or the like.

Examples of the crystalline carbon may include graphite-based carbon such as natural graphite, artificial graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like.

The silicon compound may include, for example, a silicon-carbon composite compound such as silicon oxide or silicon carbide (SiC).

For example, a form of slurry may be prepared by mixing the anode active material with a binder, a conductive material and/or thickener in a solvent, followed by stirring the same. The slurry may be applied to at least one surface of the anode current collector 127, followed by compressing and drying to manufacture the anode 120.

As the binder and the conductive material, materials which are substantially the same as or similar to the above-described materials used in the cathode active material layer 112 may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

In exemplary embodiments, the anode active material layer 122 may include a first anode portion 123 disposed on the anode current collector 127 and located adjacent to the anode tab 129 in the planar direction, and a second anode portion 125 spaced apart from the anode tab 129 and with the first anode portion 123 interposed therebetween.

For example, an electrode density of the second anode portion 125 may be lower than that of the first anode portion 123. In this case, an anode resistance in the peripheral part (e.g., the second anode portion 125) of the cathode tab 119 may be decreased to increase the limit moving speed of lithium ions in the anode. Accordingly, it is possible to prevent the lithium precipitation phenomenon caused by the lithium ions moving to the anode 120 beyond a limit moving speed.

As used herein, the expression "limit moving speed" may refer to a maximum moving speed of lithium ions in the anode 120 at which lithium precipitation phenomenon does not occur.

In some embodiments, an anode density difference defined by Equation 2 below may be 1.5 to 6%.

$$D_{dN}(\%) = \frac{D_{1N} - D_{2N}}{D_{1N}} \times 100 \quad \text{[Equation 2]}$$

In Equation 2, $D_{dN}$ may be the anode density difference, $D_{1N}$ may be the electrode density of the first anode portion, and $D_{2N}$ may be the electrode density of the second anode portion.

For example, when satisfying the above range of the anode density difference, while the anode resistance in the peripheral part (e.g., the second anode portion 125) of the cathode tab 119 is sufficiently reduced, the moving speed of lithium ions may be appropriately maintained to improve the output characteristics and life-span characteristics of the secondary battery.

For example, the anode density difference may be implemented through a thickness difference between the anode portions 123 and 125. For example, a thickness of the second anode portion 125 may be greater than that of the first anode portion 123. Accordingly, it may be designed so that the electrode density of the second anode portion 125 is smaller than that of the first anode portion 123.

In some embodiments, the electrode density of the first anode portion 123 may be 1.7 g/cc or less. In this case, the electrode density of the second anode portion 125 may be about 1.60 g/cc or less according to Equation 2 above.

In some embodiments, the cathode tab 119 and the anode tab 129 of the lithium secondary battery may protrude in directions opposite to each other in the planar direction.

In some embodiments, the above-described first cathode portion 113 and second anode portion 125 may be overlapped with each other in a thickness direction of the electrode stack structure 100, and the second cathode portion 115 and the first anode portion 123 may be overlapped with each other in the thickness direction of the electrode stack structure 100. In this case, in the peripheral parts (e.g., the first cathode portion 113 and the second anode portion 125) of the cathode tab 119, the cathode resistance may be increased and the anode resistance may be decreased. Thereby, the moving speed of lithium ions in the first cathode portion 113 may be decreased, and the moving speed of lithium ions in the second anode portion 125 may be increased. Accordingly, it is possible to suppress the swelling phenomenon during charging and discharging of the battery by implementing a uniform moving speed of lithium ions throughout the lithium secondary battery.

In some embodiments, a length of the first cathode portion 113 may be the same as that of the second anode portion 125, and a length of the second cathode portion 115 may be the same as that of the first anode portion 123. The meaning of "same" may include cases that are considered to be substantially the same, as well as cases that are mathematically the same. In this case, as shown in FIG. 2, an increase in the thickness of the electrode stack structure 100 is minimized due to efficient spatial arrangement, and the above-described effect of improving life-span characteristics may be implemented.

In some embodiments, the length of the first cathode portion 113 may be less than or equal to that of the second cathode portion 115, and the length of the second anode portion 125 may be less than or equal to that of the first anode portion 123. In this case, the output characteristics of the battery may be maintained by preventing an area of the peripheral parts (e.g., the first cathode portion 113 and the second anode portion 125) of the cathode tab 119 from being excessively increased.

In exemplary embodiments, the electrode stack structure 100 may further include the separator 130 interposed between the cathode active material layer 112 and the anode active material layer 122.

For example, the separator 130 may include a porous polymer film made of a polyolefin polymer such as ethylene homopolymer, propylene homopolymer, ethylene/butene copolymer, ethylene/hexene copolymer, ethylene/methacrylate copolymer. The separator 130 may include a nonwoven fabric made of glass fiber having a high melting point, polyethylene terephthalate fiber or the like.

In some embodiments, the separator 130 may include a first portion 132 disposed between the first cathode portion 113 and the second anode portion 125 and a second portion 134 disposed between the second cathode portion 115 and the first anode portion 123.

For example, the separator 130 may further include a stepped portion 136 between the first portion 132 and the second portion 134. For example, the above-described stepped portion 136 may come into contact with sidewalls of the second cathode portion 115 and the second anode portion 125.

For example, it may be designed so that the separator 130 is engaged and coupled with a curvature profile of the cathode active material layer 112 or a curvature profile of the anode active material layer 122. In this case, the cathode 110, the anode 120, and the separator 130 may be tightly coupled to form the electrode stack structure 100. Thereby, space efficiency of the secondary battery may be improved.

In some embodiments, the anode 120 may have an area (e.g., a contact area with the separator 130) and/or volume larger than those/that of the cathode 110. Accordingly, it is possible to prevent precipitation of lithium ions in the moving process thereof together with the effect according to the above-described structure.

Figure 3:
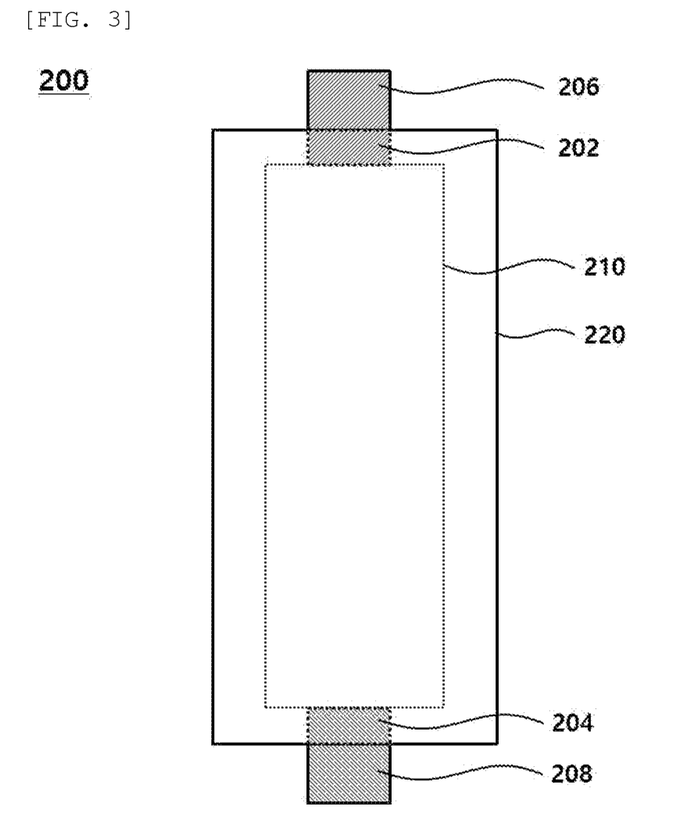
FIG. 3 is a schematic plan view illustrating a lithium secondary battery according to exemplary embodiments.

FIG. 3 is a schematic plan view illustrating a lithium secondary battery according to exemplary embodiments.

Referring to FIG. 3, a lithium secondary battery 200 may include an electrode assembly 210, a case 220 in which the electrode assembly 210 is housed, electrode tab parts 202 and 204 formed by fusing the electrode tabs 119 and 129, and electrode leads 206 and 208.

For example, an electrode cell is defined by the cathode 110, the anode 120 and the separator 130, and a plurality of electrode cells may be laminated to form the above-described electrode stack structure 100. For example, the electrode assembly may be formed in the form of a jelly roll in which the electrode stack structure 100 is wound, laminated and/or folded through winding, lamination, folding, or the like of the separator 130.

The electrode assembly 210 may be housed in the case 220 together with the electrolyte to define the lithium secondary battery 200. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion ($X^-$) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

As described above, the cathode tab 119 and the anode tab 129 may protrude from the cathode current collector 117 and the anode current collector 127, respectively, which belong to each electrode cell.

As shown in FIG. 3, the cathode tabs 119 are fused to form a cathode tab part 202 and may extend to one side of the case 220, and the anode tabs 129 are fused to form an anode tab part 204 and may extend to one side of the case 220. The electrode tab parts 202 and 204 may be fused together with the one side of the case 220 to form electrode leads (e.g., a cathode lead 206 and an anode lead 208) extending or exposed to an outside of the case 220.

The lithium secondary battery may be manufactured, for example, in a cylindrical shape using a can, a square shape, a pouch type or a coin shape.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

EXAMPLE 1

Preparation of Cathode $NiSO_4$, $CoSO_4$ and $MnSO_4$ were mixed in a ratio of 0.8:0.1:0.1, respectively, using distilled water with internal dissolved oxygen removed by bubbling with $N_2$ for 24 hours.

The solution was introduced into a reactor at 55° C., and a co-precipitation reaction was performed for 72 hours using NaOH and $NH_3H_2O$ as a precipitant and a chelating agent to obtain $Ni_{0.8}Co_{0.2}Mn_{0.2}(OH)_2$ as a transition metal precursor.

Then, lithium hydroxide and the transition metal precursor were added in a ratio of 1.03:1 in a dry high-speed mixer, followed by uniformly stirring and mixing the same for 20 minutes. The mixture was put in a calcination furnace, heated to 950° C. at a heating rate of 2° C./min, and maintained at 950° C. for 12 hours. Oxygen was passed continuously at a flow rate of 10 mL/min during heating and maintenance. After completion of the calcination, the mixture was naturally cooled to room temperature, followed by grinding and classification to prepare lithium-transition metal composite oxide particles of cathode active material $LiNi_{0.8}Co_{0.1}Mn_{0.1}O_2$. The lithium-transition metal composite oxide particles were used as a cathode active material.

The cathode active materials, Denka Black as a conductive material and PVDF as a binder were mixed in a mass ratio composition of 97:2:1, respectively, to prepare a cathode slurry. Then, the slurry was applied to an aluminum current collector adjacent to a cathode tab, followed by drying and pressing the same to prepare a first cathode portion. After the pressing, a target electrode density of the first cathode portion was controlled to 3.7 g/cc.

The cathode slurry was applied to the aluminum current collector with the first cathode portion interposed therebetween and spaced apart from the cathode tab, followed by drying and pressing the same to prepare a second cathode portion. After the pressing, a target electrode density of the second cathode portion was controlled to 3.55 g/cc.

At this time, the cathode was prepared so that a length ratio of the first cathode portion to the second cathode portion in a length direction of the battery was 5:5.

Accordingly, a cathode which includes a cathode active material layer including the first cathode portion and the second cathode portion was prepared.

Preparation of Anode

An anode slurry, which includes 93% by weight ('wt. %') of natural graphite as an anode active material, 5 wt. % of KS6 as a flake type conductive material, 1 wt. % of styrene-butadiene rubber (SBR) as a binder, and 1 wt. % of carboxymethyl cellulose (CMC) as a thickener, was prepared. The anode slurry was applied to a copper current collector adjacent to an anode tab, followed by drying and pressing the same to prepare a first anode portion. After the pressing, a target electrode density of the first anode portion was controlled to 1.6 g/cc.

The anode slurry was applied to the copper current collector with the first anode portion interposed therebetween and spaced apart from the anode tab, followed by drying and pressing the to prepare a second anode portion. After the pressing, a target electrode density of the second anode portion was controlled to 1.55 g/cc.

At this time, the anode was prepared so that a length ratio of the first anode portion to the second anode portion in the length direction of the battery was 5:5.

Accordingly, an anode which includes an anode active material layer including the first anode portion and the second anode portion was prepared.

Manufacture of Lithium Secondary Battery

The cathodes and the anodes prepared as described above were respectively notched in a predetermined size and laminated. A separator (polyethylene, thickness: 25 μm) including a first portion disposed between the first cathode portion and the second anode portion, a second portion disposed between the second cathode portion and the first anode portion, and a stepped portion between the first portion and the second portion was interposed between the cathode and the anode to form an electrode cell together with the cathode and the anode. Thereafter, tab parts of the cathode and the anode were welded, respectively. A combination of the welded cathode/separator/anode was put into a pouch, followed by sealing three sides of the pouch except for one side into which an electrolyte is injected. At this time, a portion having the electrode tab was included in the sealing part. After injecting the electrolytic through the remaining one side except for the sealing part, the remaining one side was also sealed, followed by impregnation for 12 hours or more.

The electrolyte used herein was prepared by dissolving 1M $LiPF_6$ solution in a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted on the secondary battery manufactured as described above with a current (5A) corresponding to 0.25C for 36 minutes. After 1 hour, degassing then aging for 24 hours or more were conducted, followed by formation charging-discharging (charge condition: CC-CV 0.2C 4.2 V 0.05C CUT-OFF; discharge condition: CC 0.2C 2.5 V CUT-OFF).

EXAMPLE 2

A lithium secondary battery was manufactured according to the same procedures as described in Example 1, except that the target electrode density of the first cathode portion was controlled to 3.78 g/cc and the target electrode density of the second anode portion was controlled to 1.50 g/cc.

EXAMPLE 3

A lithium secondary battery was manufactured according to the same procedures as described in Example 1, except that the target electrode density of the first cathode portion was controlled to 3.6 g/cc and the target electrode density of the second anode portion was controlled to 1.58 g/cc.

EXAMPLE 4

A lithium secondary battery was prepared according to the same procedures as described in Example 1, except that a cathode was prepared so that the length ratio of the first cathode portion to the second cathode portion in length direction of the battery was 3:7, and an anode was prepared so that the length ratio of the first anode portion to the second anode portion in the length direction of the battery was 7:3.

EXAMPLE 5

A lithium secondary battery was prepared according to the same procedures as described in Example 2, except that a cathode was prepared so that the length ratio of the first cathode portion to the second cathode portion in length direction of the battery was 3:7, and an anode was prepared so that the length ratio of the first anode portion to the second anode portion in the length direction of the battery was 7:3.

EXAMPLE 6

A lithium secondary battery was prepared according to the same procedures as described in Example 3, except that a cathode was prepared so that the length ratio of the first cathode portion to the second cathode portion in length direction of the battery was 3:7, and an anode was prepared so that the length ratio of the first anode portion to the second anode portion in the length direction of the battery was 7:3.

EXAMPLE 7

A lithium secondary battery was prepared according to the same procedures as described in Example 1, except that a cathode was prepared so that the length ratio of the first cathode portion to the second cathode portion in length direction of the battery was 7:3, and an anode was prepared so that the length ratio of the first anode portion to the second anode portion in the length direction of the battery was 3:7.

EXAMPLE 8

A lithium secondary battery was prepared according to the same procedures as described in Example 2, except that a cathode was prepared so that the length ratio of the first cathode portion to the second cathode portion in length direction of the battery was 7:3, and an anode was prepared so that the length ratio of the first anode portion to the second anode portion in the length direction of the battery was 3:7.

EXAMPLE 9

A lithium secondary battery was prepared according to the same procedures as described in Example 3, except that a cathode was prepared so that the length ratio of the first cathode portion to the second cathode portion in length direction of the battery was 7:3, and an anode was prepared so that the length ratio of the first anode portion to the second anode portion in the length direction of the battery was 3:7.

COMPARATIVE EXAMPLE

A cathode active material layer was formed by uniformly applying a cathode slurry to the aluminum current collector, then drying and pressing the same without distinction of the first cathode portion and the second cathode portion, and a target electrode density of the cathode active material layer was controlled to 3.55 g/cc.

A lithium secondary battery was prepared according to the same procedures as described in Example 1, except that an anode slurry was uniformly applied to a copper current collector, then dried and pressed without distinction between the first anode portion and the second anode portion to form an anode active material layer, and a target electrode density of the anode active material layer was controlled to 1.6 g/cc.

Electrode densities and electrode density differences between the lithium secondary batteries manufactured according to the above-described examples and comparative examples are shown in Table 1 below.

TABLE 1

| Section | Electrode density(g/cc) | | | | Cathode density difference (%) | Anode density difference (%) |
| --- | --- | --- | --- | --- | --- | --- |
| | First Cathode Portion | Second Cathode Portion | First Anode Portion | Second Anode Portion | | |
| Examples 1, 4 and 7 | 3.7 | 3.55 | 1.6 | 1.55 | 4.2 | 3.1 |
| Examples 2, 5 and 8 | 3.78 | 3.55 | 1.6 | 1.50 | 6.5 | 6.25 |
| Examples 3, 6 and 9 | 3.6 | 3.55 | 1.6 | 1.58 | 1.4 | 1.25 |
| Comparative Example | 3.55 | | 1.6 | | — | — |

EXPERIMENTAL EXAMPLE (1) Measurement of Discharge Output and Direct Current Internal Resistance (DCIR)

A hybrid pulse power characterization (HPPC) test was performed on the lithium secondary batteries manufactured according to the above-described examples and comparative examples to measure discharge output and discharge DCIR values.

(2) Calculation of Capacity and Capacity Retention Rate

After repeatedly charging (CC-CV 1.0C 4.2 V 0.05C CUT-OFF) and discharging (CC 1.0C 2.7 V CUT-OFF) the lithium secondary batteries manufactured according to the above-described examples and comparative examples 300 times in a chamber at 25° C., capacity retention rates after 300 cycles were evaluated by calculating the discharge capacity at 300 times as a percentage (%) based on the discharge capacity at one time.

The measured results are shown in Table 2 below.

TABLE 2

| Section | Length ratio of first cathode portion to second cathode portion | Discharge output (w/kg) | Discharge DCIR (mω) | Initial capacity (ah) | Capacity after 300 cycles (ah) | Capacity retention rate (%) |
| --- | --- | --- | --- | --- | --- | --- |
| Example 1 | 5:5 | 2,442 | 4.57 | 19.4 | 15.9 | 82.0 |
| Example 2 | 5:5 | 2,221 | 4.84 | 19.4 | 16.2 | 83.5 |
| Example 3 | 5:5 | 2,638 | 4.32 | 19.5 | 14.8 | 75.9 |
| Example 4 | 3:7 | 2,523 | 4.50 | 19.5 | 15.7 | 80.5 |
| Example 5 | 3:7 | 2,301 | 4.71 | 19.4 | 16.0 | 82.5 |
| Example 6 | 3:7 | 2,642 | 4.31 | 19.4 | 14.7 | 75.8 |
| Example 7 | 7:3 | 2,219 | 4.90 | 19.4 | 16.0 | 82.5 |
| Example 8 | 7:3 | 1,889 | 5.31 | 19.5 | 16.4 | 84.1 |
| Example 9 | 7:3 | 2,600 | 4.39 | 19.4 | 14.9 | 76.8 |
| Comparative Example | — | 2,710 | 4.28 | 19.5 | 14.1 | 72.3 |

Referring to Table 2, in the lithium secondary batteries of the examples including a first cathode portion and a second cathode portion having different electrode densities from each other, and a first anode portion and a second anode portion having different electrode densities from each other, relatively superior capacity retention rates were secured compared to the lithium secondary battery of the comparative example having uniform electrode densities of the anode and the cathode, respectively.

However, in the lithium secondary batteries of Examples 2, 5 and 8 having a cathode density difference and an anode density difference exceeding 6%, the resistance was increased such that the output characteristics was slightly reduced compared to the lithium secondary batteries of Examples 1, 4 and 7 having a cathode density difference and an anode density difference satisfying a range of 1.5 to 6%.

In addition, in the lithium secondary batteries of Examples 3, 6 and 9 having a cathode density difference and an anode density difference less than 1.5%, the moving speed of lithium ions was decreased compared to the lithium secondary batteries of Examples 1, 4 and 7, such that the capacity retention rate was slightly reduced.

Further, in the lithium secondary batteries of Examples 4 to 6, in which the length ratio of the first cathode portion to the second cathode portion in length direction of the battery was 3:7 and the length ratio of the first anode portion to the second anode portion in the length direction of the battery was 7:3, low resistance and excellent output characteristics were exhibited compared to the lithium secondary batteries of other examples.

However, in the lithium secondary batteries of Examples 7 to 9, in which the length ratio of the first cathode portion to the second cathode portion in length direction of the battery was 7:3 and the length ratio of the first anode portion to the second anode portion in the length direction of the battery was 7:3, an area of the peripheral parts (the first cathode portion and the second anode portion) of the cathode tab having a high electrode density was excessively widened, such that the overall resistance of the battery was increased and the output characteristics were slightly decreased compared to the lithium secondary batteries of other examples.

DESCRIPTION OF REFERENCE NUMERALS

100: Electrode stack structure
110: Cathode
112: Cathode active material layer
113: First cathode portion
115: Second cathode portion
117: Cathode current collector
119: Cathode tab
120: Anode
122: Anode active material layer
123: First anode portion
125: Second anode portion
127: Anode current collector 129: Anode tab
130: Separator
200: Lithium secondary battery
202: Cathode tab part
204: Anode tab part
206: Cathode lead
208: Anode lead
210: Electrode assembly
220: Case

What is claimed is:

1. A lithium secondary battery comprising:
a cathode including a cathode current collector including a cathode tab protruding from one end thereof, and a cathode active material layer formed on the cathode current collector; and
an anode disposed to face the cathode,
wherein the cathode active material layer comprises:
a first cathode portion disposed adjacent to the cathode tab in a planar direction; and
a second cathode portion spaced apart from the cathode tab with the first cathode portion interposed therebetween in the planar direction and having an electrode density lower than that of the first cathode portion,
wherein a cathode density difference defined by Formula 1 below is 1.5 to 6%:

$$D_{dP}(\%) = \frac{D_{1P} - D_{2P}}{D_{2P}} \times 100 \quad \text{[Equation 1]}$$

$D_{dP}$ is the cathode density difference, $D_{1P}$ is an electrode density of the first cathode portion, and $D_{2P}$ is an electrode density of the second cathode portion.

2. The lithium secondary battery according to claim 1, wherein the anode comprises:
an anode current collector including an anode tab protruding from one end thereof; and
an anode active material layer formed on the anode current collector,
wherein the anode active material layer comprises:
a first anode portion disposed adjacent to the anode tab in the planar direction; and
a second anode portion spaced apart from the anode tab with the first anode portion interposed therebetween in the planar direction and having an electrode density lower than that of the first anode portion.

3. The lithium secondary battery according to claim 2, wherein an anode density difference defined by Formula 2 below is 1.5 to 6%:

$$D_{dN}(\%) = \frac{D_{1N} - D_{2N}}{D_{1N}} \times 100 \quad \text{[Equation 2]}$$

(In Equation 2, $D_{dN}$ is the anode density difference, $D_{1N}$ is an electrode density of the first anode portion, and $D_{2N}$ is an electrode density of the second anode portion).

4. The lithium secondary battery according to claim 2, wherein the first cathode portion and the second anode portion are overlapped with each other in a thickness direction, and the second cathode portion and the first anode portion are overlapped with each other in the thickness direction.

5. The lithium secondary battery according to claim 4, wherein a length of the first cathode portion is the same as that of the second anode portion, and a length of the second cathode portion is the same as that of the first anode portion in the planar direction.

6. The lithium secondary battery according to claim 2, wherein the cathode tab and the anode tab protrude in directions opposite to each other in the planar direction.

7. The lithium secondary battery according to claim 2, wherein a length of the first cathode portion is less than or equal to that of the second cathode portion, and a length of the second anode portion is less than or equal to that of the first anode portion.

8. The lithium secondary battery according to claim 2, wherein a thickness of the first cathode portion is smaller than that of the second cathode portion, and a thickness of the second anode portion is greater than that of the first anode portion.

9. The lithium secondary battery according to claim 8, further comprising a separator disposed between the cathode active material layer and the anode active material layer,
wherein the separator comprises:
a first portion disposed between the first cathode portion and the second anode portion;
a second portion disposed between the second cathode portion and the first anode portion; and
a stepped portion between the first portion and the second portion.

10. The lithium secondary battery according to claim 9, wherein the stepped portion contacts sidewalls of the second cathode portion and the second anode portion.

11. The lithium secondary battery according to claim 2, wherein an electrode density of the first cathode portion is 3.6 g/cc or less, and an electrode density of the first anode portion is 1.7 g/cc or less.

* * * * *